J. IVERSON.
NONSKID CHAIN.
APPLICATION FILED OCT. 13, 1921.
1,418,873.
Patented June 6, 1922.
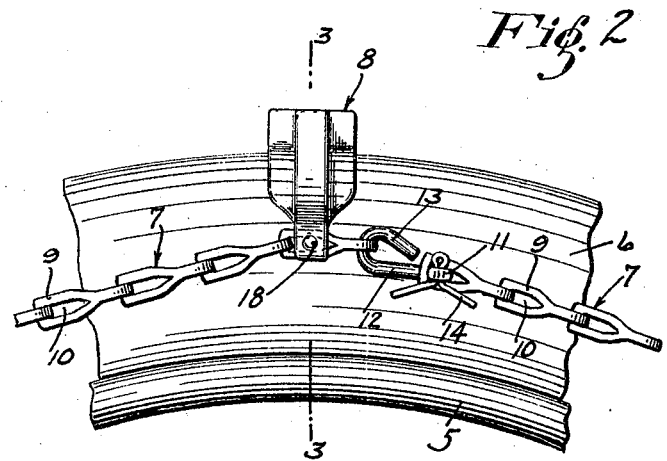
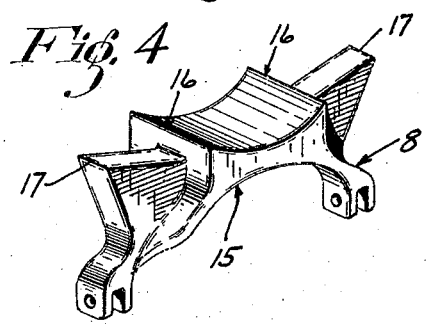
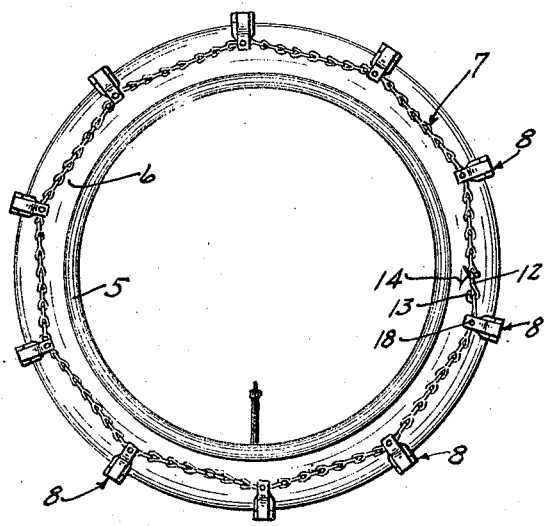
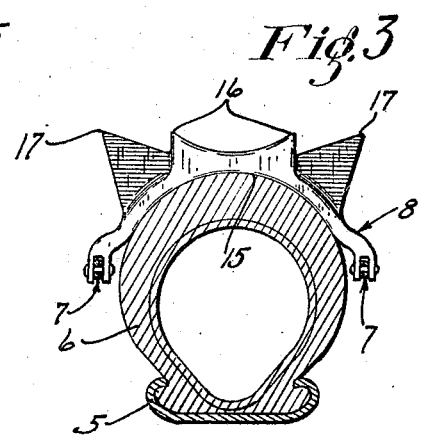
Inventor
John Iverson
By his Attorneys
Merchant & Kilgore

UNITED STATES PATENT OFFICE.

JOHN IVERSON, OF MINNEAPOLIS, MINNESOTA.

NONSKID CHAIN.

1,418,873.   Specification of Letters Patent.   Patented June 6, 1922.

Application filed October 13, 1921. Serial No. 507,512.

*To all whom it may concern:*

Be it known that I, JOHN IVERSON, a citizen of the United States, residing at Minneapolis, in the county of Hennepin and State of Minnesota, have invented certain new and useful Improvements in Nonskid Chains; and I do hereby declare the following to be a full, clear, and exact description of the invention, such as will enable others skilled in the art to which it appertains to make and use the same.

My invention has for its object to provide an extremely simple and highly efficient non-skid chain for motor vehicles, and to this end, it consists of the novel devices and combinations of devices hereinafter described and defined in the claims.

In the accompanying drawings, which illustrate the invention, like characters indicate like parts throughout the several views.

Referring to the drawings:—

Fig. 1 is a side elevation of a demountable rim having a pneumatic tire to which the invention is applied;

Fig. 2 is a fragmentary side elevation of the parts shown in Fig. 1 on an enlarged scale;

Fig. 3 is a view partly in elevation and partly in transverse section on the line 3—3 of Fig. 2; and Fig. 4 is a perspective view of one of the traction lugs.

The numeral 5 indicates a demountable rim on which is mounted, a pneumatic tire 6 having the improved non-skid chain applied thereto.

The invention comprises two side chains 7 and a multiplicity of circumferentially spaced transverse traction lugs 8 attached to said side chains. Each side chain 7, as shown, is made up of stamped U-shaped links 9 having in their arms, apertures 10, through which the transverse portions of adjacent links extend to flexibly connect the links of the chains.

The two ends of each side chain 7 are separably connected by a straight hook 11 having its shank 12 bent upon itself to form an eye 13 which is interlocked with the transverse portion of the link 9 at one end of the side chain 7. This hook 11 is releasably inserted through the apertures 10 in the link 9 at the other end of the side chain and is held therein, by a cotter pin 14 inserted through a bore in said hook.

Each traction lug 8 is cast in a single piece, and has on its inner face, a segmental tire engaging seat 15 adapted to fit the tire for which it is intended. On the outer or tread surface of each traction lug 8 is a pair of intermediate main teeth 16 and a pair of auxiliary teeth 17 located between said main teeth and the ends of the traction lugs 8. These pairs of teeth 16 and 17 are reversely formed on opposite sides of the transverse center of the traction lug 8, and, as shown, the main teeth 16 are of the same width as the traction lug 8, and the auxiliary teeth 17 are considerably narrower than the said main teeth and the traction lug, for a purpose that will presently appear.

The ends of the traction lugs 8 are bifurcated to receive the side chains 7 and are radially offset from the tire-engaging portions 15 of said traction lugs 8, as best shown in Fig. 3. The side chains 7 are secured in the bifurcated ends of the traction lugs 8 by rivets 18 which extend through alined bores in said ends and the apertures 10 in the links 9, which are within said bifurcated ends. The offset ends of the traction lugs 8 hold the side chains 7 out of engagement with the sides of the tire 6, and are, themselves, out of engagement with said sides, thus, permitting the tire to become partly deflated without touching said ends and thereby injured.

The points of the pairs of teeth 16 and 17, on each traction lug 8, are alined, so that they are all in direct contact with the road-bed at the same time, and the reversely formed teeth 16 and 17 securely hold a tire against side skid in either direction. By making the auxiliary teeth 17 narrower than the main teeth 16, exposed surfaces are left on the main teeth 16 and the bodies of the traction lugs 8, which, when in the ground, cause considerable lateral resistance and thereby further prevent and hold the tire from side skidding. The traction lugs 8 also greatly increase the traction of the tire by their engagement with a road-bed and when in the ground act as mud lugs and greatly increase the traction of the tire.

To apply the improved non-skid chain to a tire, said tire is preferably slightly deflated and said chain secured thereto, by inserting the said hooks 11 in the respective link 9 and securing the same by the cotter pins 14, and then again, inflating the tire. To remove the improved non-skid chain from a tire, it is only necessary to withdraw the cotter pins 14 and release the hooks 11 from the engaged links 9. The above described invention, while extremely simple, and of comparatively small cost to manufacture, has in actual usage proven highly efficient for the purpose had in view.

What I claim is:—

1. A yoke-like traction lug applicable to a tire and having pairs of laterally spaced main and auxiliary teeth the points of which are substantially aligned.

2. A yoke-like traction lug applicable to a tire and having an intermediate pair of laterally spaced main teeth, and an outer pair of auxiliary teeth, the points of said teeth being substantially aligned.

3. A yoke-like traction lug applicable to a tire and having an intermediate pair of laterally spaced main teeth and an outer pair of auxiliary teeth, said main teeth being relatively wide and said auxiliary teeth being relatively narrow and located intermediate of the ends of said main teeth.

4. A yoke-like traction lug applicable to a tire and having an intermediate pair of laterally spaced main teeth and an outer pair of auxiliary teeth, said main teeth being relatively wide and said auxiliary teeth being relatively narrow and located intermediate of the ends of said main teeth, the points of said teeth being substantially aligned.

5. A yoke-like traction lug applicable to a tire and having an intermediate pair of laterally spaced main teeth the outer sides of which are substantially parallel to each other and an outer pair of auxiliary teeth, said main teeth being relatively wide and said auxiliary teeth being relatively narrow and located intermediate of the ends of said main teeth, the points of said teeth being substantially aligned.

6. A yoke-like traction lug applicable to a tire and having an intermediate pair of laterally spaced main teeth the outer sides of which are substantially parallel to each other and an outer pair of auxiliary teeth, said main teeth being relatively wide and said auxiliary teeth being relative narrow and located intermediate of the ends of said main teeth, the points of said teeth being substantially aligned, the inner sides of the auxiliary teeth being extended to the outer sides of the main teeth below the points thereof.

7. A yoke-like traction lug applicable to a tire and having an intermediate pair of laterally spaced main teeth the outer sides of which are substantially parallel to each other and an outer pair of auxiliary teeth, said main teeth being relatively wide and said auxiliary teeth being relatively narrow and located intermediate of the ends of said main teeth, the points of said teeth being substantially aligned, the inner sides of the auxiliary teeth being extended to the outer sides of the main teeth below the points thereof, the ends of the traction lug being extended beyond the auxiliary teeth and laterally offset.

8. A yoke-like traction lug applicable to a tire and having laterally spaced main and auxiliary teeth the points of which are transversely aligned.

9. A non-skid chain comprising a pair of side chains, and a transverse traction lug having in its ends openings through which said side chains extend, said openings permitting the side chains to be applied therein or removed therefrom by lateral movement, said side chains being held in said openings against longitudinal movement.

In testimony whereof I affix my signature.

JOHN IVERSON.